(12) United States Patent
Lin et al.

(10) Patent No.: US 8,269,856 B2
(45) Date of Patent: Sep. 18, 2012

(54) AUTOMATIC FOCUSING SYSTEM IN LOW-ILLUMINATION SETTING AND METHOD USING THE SAME

(75) Inventors: Peng-Wei Lin, Hsinchu (TW); Li-Wen Kuo, Taichung County (TW)

(73) Assignee: Altek Corporation, Hsinchu (TW)

( * ) Notice: Subject to any disclaimer, the term of this patent is extended or adjusted under 35 U.S.C. 154(b) by 312 days.

(21) Appl. No.: 12/816,176

(22) Filed: Jun. 15, 2010

(65) Prior Publication Data

US 2011/0085053 A1 Apr. 14, 2011

(30) Foreign Application Priority Data

Oct. 9, 2009 (TW) .............................. 98134366 A

(51) Int. Cl.
*H04N 5/235* (2006.01)
(52) U.S. Cl. ................... 348/229.1; 348/231.6; 348/349
(58) Field of Classification Search ............... 348/229.1, 348/230.1, 255, 345, 349, 231.99, 231.6
See application file for complete search history.

(56) References Cited

U.S. PATENT DOCUMENTS

| 5,422,671 A * | 6/1995 | Yamada et al. ............... 348/345 |
| 7,750,950 B2 * | 7/2010 | Tamaru et al. ............. 348/227.1 |
| 2011/0317032 A1 * | 12/2011 | Yamashita et al. ......... 348/229.1 |

* cited by examiner

*Primary Examiner* — Tuan Ho
(74) *Attorney, Agent, or Firm* — Muncy, Geissler, Olds & Lowe, PLLC

(57) ABSTRACT

An automatic focusing system in a low-illumination setting and a method using the same are disclosed. Through a selection of the memory bits and a tone adjustment, an automatic focusing could be precisely achieved. According to one embodiment, a lens module and an image sensor are firstly used for generating the digital image signals. Next, a gain adjustment unit is introduced to adjusting the gain of the signals, so as to reduce the noises. A memory bit retrieving unit is further used to retrieve the data from a plurality of memory bits. Next, a tone adjusting process is performed to raise the signals' contrast.

17 Claims, 7 Drawing Sheets

AUTOMATIC FOCUSING SYSTEM IN LOW-ILLUMINATION SETTING AND METHOD USING THE SAME

BACKGROUND OF THE INVENTION

1. Field of the Invention

The present invention generally relates to an automatic focusing (AF) system in a low-illumination setting and a method using the same, and more particularly, to an AF system and a method that is capable of achieving the goal of real-time focusing by selection of memory bits and tone adjustment.

2. Description of Related Art

AF technology is developed for the cameras or video cameras to maintain the lens within a focal length so as to generate a clear picture. As such, AF technology has been incorporated into digital cameras and video cameras.

There are several ways to implement a modern AF technology, and they are categorized into a passive mode and an active mode. The passive-mode AF measures the light reflected from an object before calculating where to move the lens. If the object is positioned in a low-illumination setting, an auxiliary focusing lamp is often used for light compensation. When the auxiliary focusing lamp is in use, a color beam is projected onto and reflected back by the object. Consequently, a sufficient amount of the light could be reflected back from the object through which a focal length could be analyzed before the position of the lens could be adjusted.

The active-mode AF technology allows the camera or the video camera to issue a supersonic wave or an infrared ray before measuring the distance between the object and the camera according to the issued supersonic wave or infrared ray reflected from the object. Particularly, the propagated time or the reflective angle is used for obtaining the distance so that the camera may adjust the focal length.

With the advance of the technology, some cameras or video cameras are equipped with AF technology through real-time capturing an image by an image sensor and previewing the image through a LCD screen in the camera or video camera, which is an example of live view automatic focusing. Such AF technology is configured to accomplish a composition and the automatic focusing simultaneously with the camera or video camera installed with a processor capable of processing a large volume of images. Through the processor dedicated to processing the images, the camera or video camera may adjust its focus by comparing the image captured by the image sensor in a real-time fashion via an image definition computation.

Please refer to FIG. 1 of a flow chart illustrating a conventional AF procedure. The AF procedure includes driving a stepping motor to move a focusing lens (step S101). When the focusing lens is moved to a specific position, an image is captured by a lens array (step S103). In step S105, one object's definitions at several preset positions are calculated and the corresponding focal lengths can be obtained as well. The procedure then determines whether it has sufficient data or not (step S107) to determine a most suitable focal position. If the data is not yet sufficient, the conventional procedure repeats the steps of moving the focusing lens through the stepping motor, capturing the image, and calculating the definitions. If the data is sufficient, the procedure is configured to estimate which position of the focusing lens is associated with a finest definition. The position associated with finest definition serves as the basis for the determination of the most suitable focal position that tends to be associated with a clearest image (step S109). After that, the lens array is moved to that position to accomplish the entire procedure (step S111).

However, the image captured by the previously discussed AF procedure may be associated with insufficient illumination, rendering the automatic focusing to be inaccurate.

FIG. 2 shows a block diagram of a conventional digital camera. The conventional digital camera includes circuits for automatic white balance, automatic exposure, and automatic focusing. The camera captures images via a lens 20, and the images are received by an image sensor 21 and converted into digital signals. Those digital signals are processed by an image pre-processing unit 22 before their color temperatures are adjusted by an automatic white-balance unit 23. An image signal processor 24 then previews, photographs, and/or stores the images. During the course of capturing the images, an automatic exposure unit 27 is necessary for the calculation of an exposure value while an automatic focusing unit 28 is configured to obtain an accurate imaging distance. Thereafter, the information including the exposure value and the imaging distance is used for controlling a lens motor via a motor driver 29 before any properly focused image could be obtained.

However, the capturing of the image by the image sensor, the image processing, the image preview, and the image storage may be associated with retrievals of the higher memory bits due to the hardware design at the expense of focusing accuracy. In a low-illumination setting, the retrieval of the higher memory bits may cause a loss of details of the image captured, increasing the noise and further undermining the focusing accuracy.

SUMMARY OF THE INVENTION

One of the objects of the present invention is to incorporate an automatic focusing system into a general digital camera or video camera. The invention particularly achieves an accurate focusing by means of selecting suitable memory bits, and tone adjustment.

The automatic focusing system in a low-illumination setting according to the present invention includes a lens module for taking an image, an image sensor connected with the lens module for converting the taken image into digital image signals, a gain adjustment unit connected to the image sensor for adjusting a gain of the digital image signals in order to reduce a noise associated with the digital image signals, a memory bits retrieving unit connected with the gain adjustment unit for retrieving data in memory bits of the digital image signals after the noise associated with the digital image signals has been reduced, a tone adjustment unit connected with the memory bits retrieving unit for performing a tone adjustment for the digital image signals, thereby increasing a contrast of the digital image signals, a focused image generating unit connected with the tone adjustment unit for receiving the digital image signals, and converting the digital image signals into a focused image, and a focusing unit connected to the focused image generating unit and the lens module, wherein the focusing unit firstly calculates a definition of the focused image, and automatically adjusts the lens module for further photographing according to a focus associated with the definition.

For further understanding of the invention, reference is made to the following detailed description illustrating the embodiments and examples of the invention. The description is only for illustrating the invention and is not intended to limit of the scope of the claim.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

A live-view AF is to process an image captured through a lens and an image sensor. When the digital camera or video camera captures the image, a driving motor for the lens firstly drives the lens to move to predetermined positions and some definitions associated with the corresponding predetermined positions are calculated. Generally, the image at one position that is associated with a largest definition can be automatically obtained. One of the steps of automatically searching is to continuously compute the image's edge definition, and locate the position with the largest image edge's definition. Usually, the schemes to obtain the definition include, but not limit to, a Sobel filter and a Laplacian filter.

The ordinary image processing procedure may lose the image's details due to the hardware's limitation. And since a brightness of the image in a low-illumination setting is relatively low with larger noise the focusing accuracy is easily affected.

Figure 1:
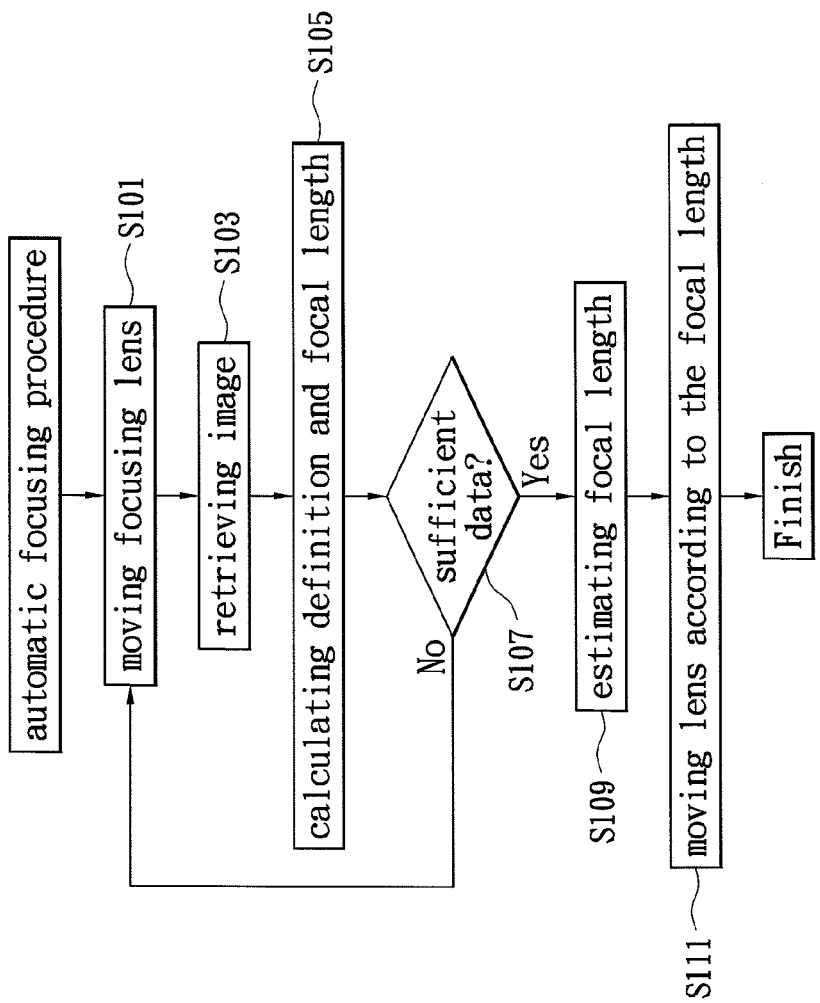
FIG. 1 is a flow chart illustrating a conventional AF procedure.
Figure 2:
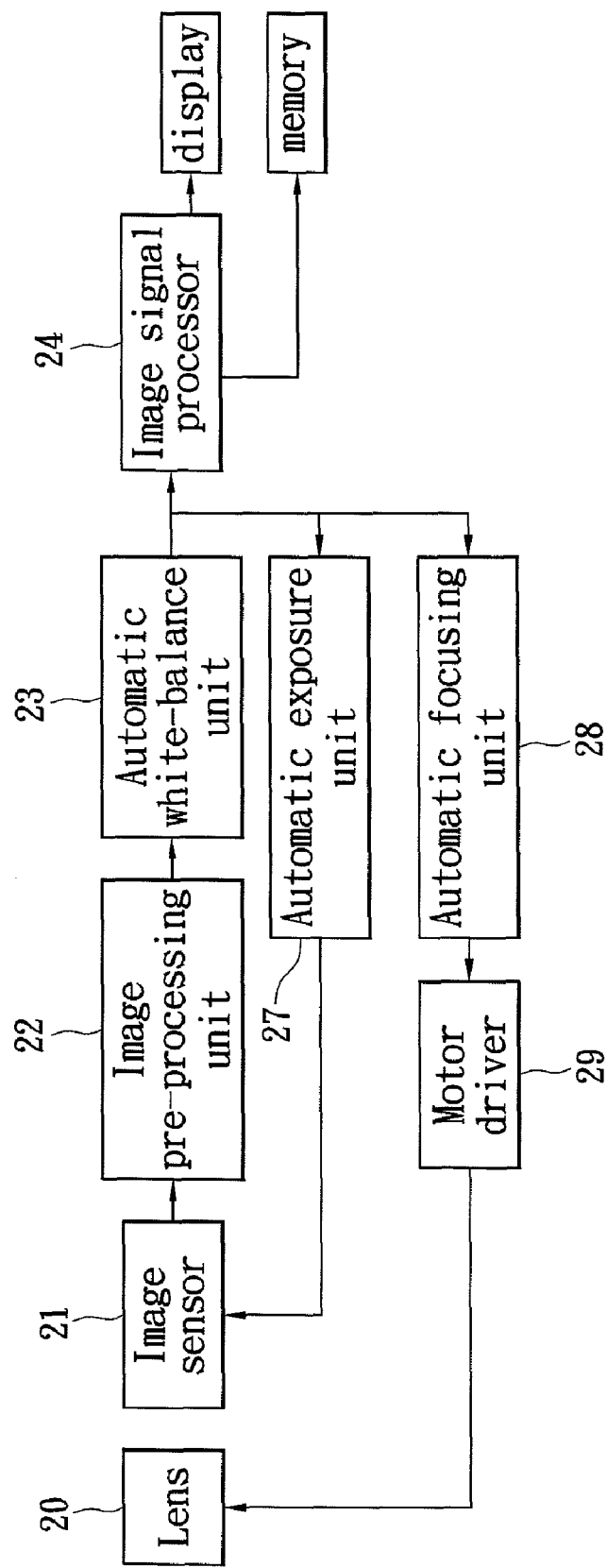
FIG. 2 shows a block diagram of a conventional digital camera.
Figure 3:
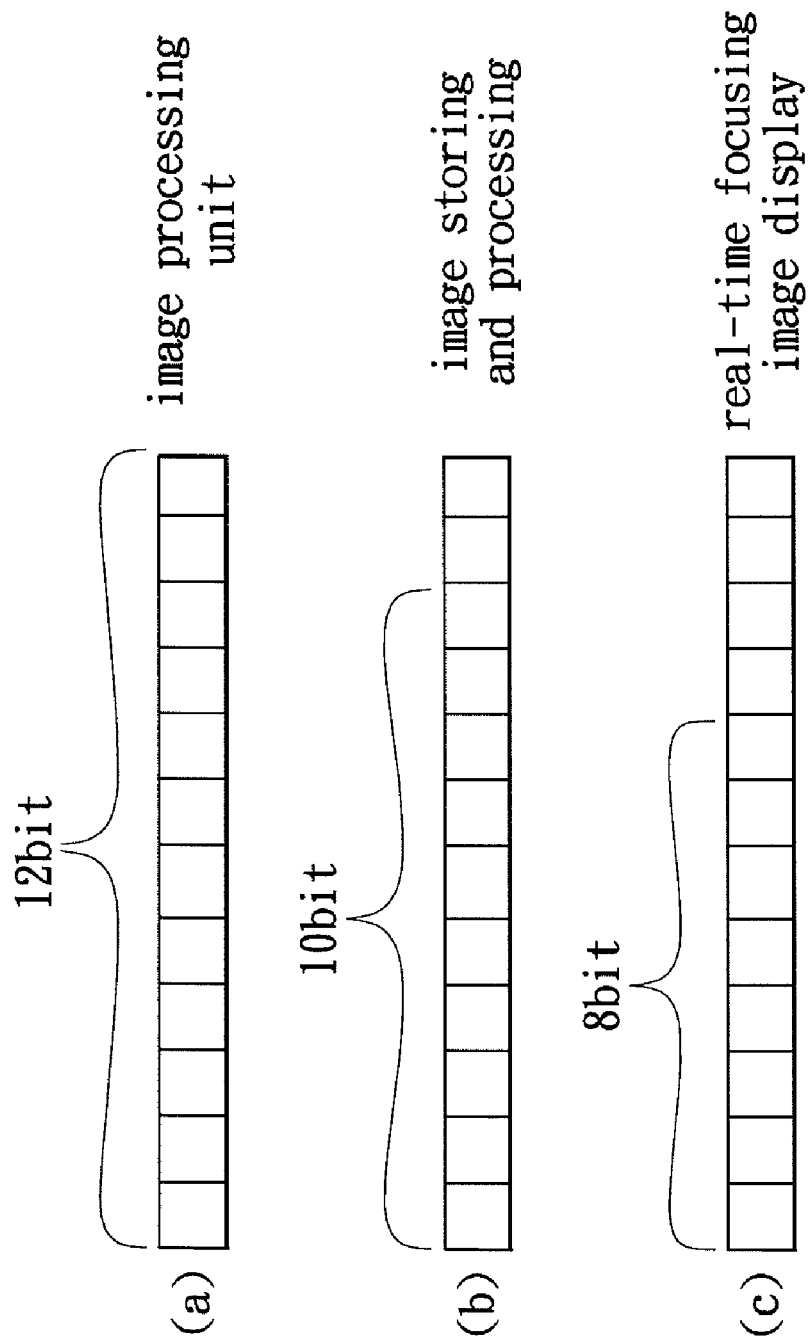
FIG. 3 shows a schematic diagram illustrating states of memory bits.

FIG. 3 shows a schematic diagram illustrating states of memory bits. More specifically, FIG. 3 shows the number of the memory bits used may vary at different states. For example, the capture of the image with the lens, the conversion into digital image signals by the image sensor, and the entry into an image processor may require 12 bits of the memory space shown in (a). Meanwhile, the process of the captured image and the storage of the image may require 10 bits of the memory space shown in (b).

Moreover, considering the generation of an image indicative of a real-time focusing image display may only require 8 bits of the memory space shown in (c).

The present invention generally provides an automatic focusing system in a low-illumination setting scene and a method using the same. The invention is directed to the potential loss of details of the image over course of image processing by selecting the effective memory bits and adjusting the color tone before a focused image could be generated.

Figure 4:
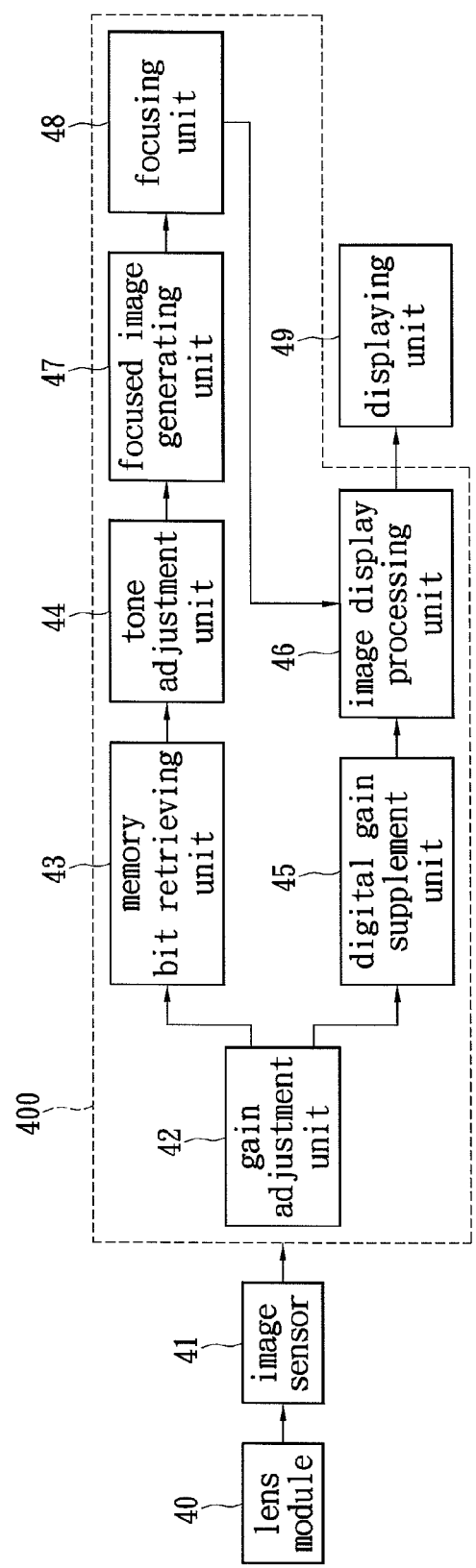
FIG. 4 shows a block diagram of an AF system according to one embodiment of the present invention.

Reference is made to FIG. 4 showing a schematic diagram of blocks of an AF system according to one embodiment of the present invention. The AF system includes an image processing module 400 to perform an optimization of a real-time image for enhancing the capability of live-view focusing.

A lens module 40 is used to capture an image. The lens module 40 further includes a lens array, which is used to find the focusing position. Image signals are retrieved by an image sensor 41 connected with the lens module 40 after the capture of an image. The retrieved signals are then converted into digital image signals after being captured by an image sensor 41 coupled to the lens module 40. The image sensor 41 could be a CCD or CMOS.

In order to reduce image noise, the present invention AF system is equipped with a gain adjustment unit 42 connected with the image sensor 41 and capable of adjusting a gain of the digital image signals in order to reduce the noise. In one implementation, the gain adjustment made to the digital image signals is to decrease the gain of the image sensor 41, minimizing the image noise accordingly. Although the noise can be reduced by decreasing the gain of the image sensor 41, the quality of the image itself may be affected. Therefore, a digital gain modulation will be adopted to compensate the decrease in gain of the image sensor 41 for ensuring the image quality as photographing under an ordinary situation. The digital gain supplement unit 45 is configured to receive the digital image signals after the gain thereof has been reduced by the image sensor 41 before applying an increased gain.

After the gain of the digital image signals is reduced by the gain adjustment unit 42, a memory bit retrieving unit 43 connected with the gain adjustment unit 42 is used to retrieve such digital image signals by retrieving the data in the memory bits. For example, 8 bits of the data of the digital image signals stored in the 10-bit memory space could be retrieved. Such retrieval may pick up the data in the lower memory bits to avoid the loss of the details of the image since the higher memory bits are often without data stored as photographing in a low-illumination setting.

A tone adjustment unit 44, which is connected with the memory bit retrieving unit 43, is introduced. The tone adjustment unit 44 is used to perform a tone adjustment (tone mapping) process on the digital image signals in order to raise the contrast thereof. The tone adjustment process is to linearly amplify the data retrieved from the memory bits to a predetermined range, in order to magnify the details of the data. The tone adjustment process helps facilitate the focusing of the image.

A focused image generating unit 47 is connected with the tone adjustment unit 44, and used for receiving the digital image signals processed by tone adjustment unit 44. The focused image generating unit 47 is configured to generate a focused image. This focused image is used to be the image for the live-view focusing. A focusing unit 48 connected to the focused image generating image 47 is then used to calculate the definition of the focused image. Next, the lens module 40 can be adjusted automatically according to the focal length that is associated with a clear focused image before the photographing could proceed.

The image processing module 400 further has an image display processing unit 46 used to obtain position information of the lens module 40 from the focusing unit 48. The position information is then outputted to the driving motor, which accordingly moves the lens module 40 to the position corresponding to the received position information. The imaging by the lens module 40 after automatic focusing is applicable to display of a real-time image. That means that the image display processing unit 46 may simultaneously provide a displaying unit 49 with the real-time image for user's preview.

Figure 5:
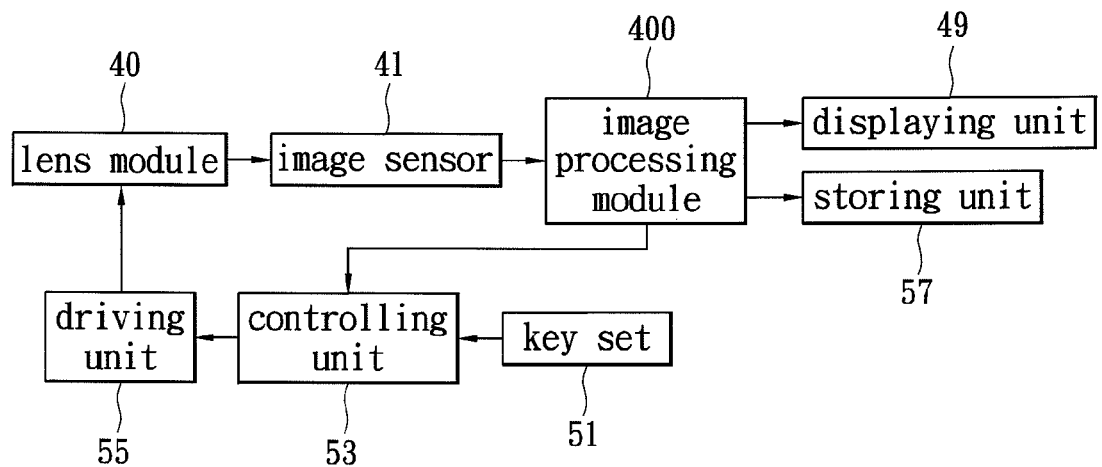
FIG. 5 is a simplified block diagram of a camera system with an AF system according to one embodiment of the present invention.

FIG. 5 draws a simplified block diagram of a camera system with an AF system in a low-illumination setting according to one embodiment of the present invention.

In conjunction with FIG. 4, when the image is captured by the lens module 40, retrieved by the image sensor 41, and converted into the digital image signals the real-time image for focusing and preview may be displayed by the displaying unit 49 or the digital image signals may be stored in a memory unit 57 thereafter.

In the meantime, information of the focusing resulted from the image processing module 400 is transferred to a controlling unit 53. The controlling unit 53 receives a command generated by the user pressing one of the key set 51 such as half-pressing the shutter button for performing the AF procedure. The controlling unit 53 is configured to receive the focusing information, and thus to control a driving unit 55 to drive the lens module 40 for adjusting the position of focusing lens.

After repeating the mentioned focusing procedure, an optimal focusing result may be achieved and the real-time live-view AF may be obtained accordingly.

During the focusing, the lens module 40 will be moved to several positions for the corresponding definitions to be computed. One of the ways to compute the definition is to compare the pixels of image's edge, and estimate the position of a largest definition, which may correspond to the result of automatic focusing.

Figure 6:
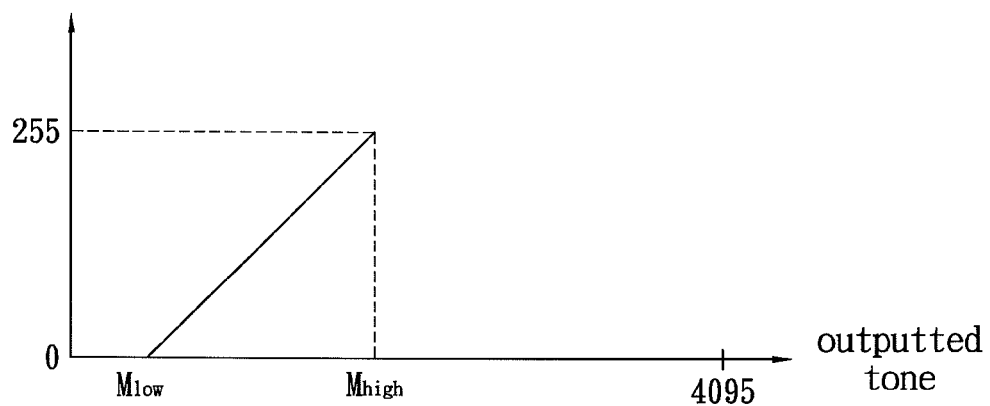
FIG. 6 shows a schematic diagram of a curve corresponding to a tone adjustment according to one embodiment of the present invention.

One embodiment of the present invention suggests decreasing the gain for the image sensor before the performance of AF. Meanwhile, once the consideration such as hardware design, cost, or efficiency, only the data in the effective memory bits is retrieved. In the low-illumination setting, FIG. 6 shows a schematic diagram of a curve corresponding to a tone adjustment according to one embodiment of the present invention. In FIG. 6, the digital image signals are linearly magnified, in order to preserve more details of the image.

In FIG. 6, the horizontal axis corresponds to an inputted tone while the vertical axis corresponds to an outputted tone. The inputted tone may range from 0 to 4095 (12 bits), and a part of the details will be lost since only the data in the certain memory bits are selected. In one implementation, after the calculation of the average value and the standard deviation of the brightness of a captured image, the inputted tone may be limited between the values of $M_{low}$ and $M_{high}$. Next, the inputted tone is linearly magnified to render the outputted tone to range between 0 and 255 (8 bits). Since the details would be magnified accordingly, the real-time live-view focusing could be implemented.

Figure 7:
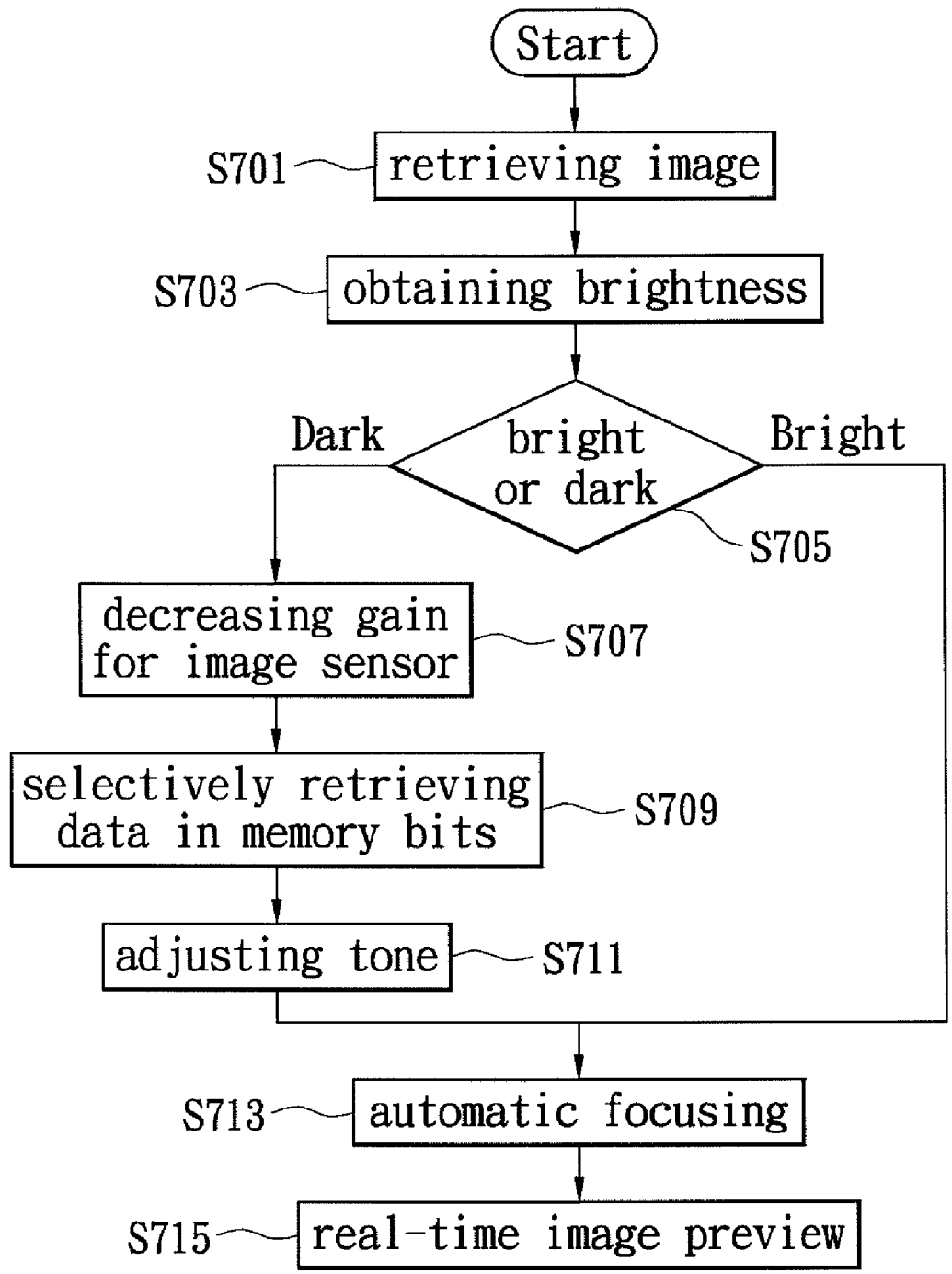
FIG. 7 is a flow chart of an AF method according to one embodiment of the present invention.

Reference is made to FIG. 7 describing a flow chart of an AF method according to one embodiment of the present invention.

In the beginning step S701, a lens module is used to capture an image, and its brightness can be obtained from an exposure value after an automatic exposure process (step S703). In the meantime, a threshold is incorporated for determination of whether the brightness of the captured image is in a high or low illumination setting (step S705).

If the image is in a high-illumination setting, the captured image could be leading to an accurate focusing and the AF could be performed in step S713. After that, a real-time image is produced for user's preview (step S715).

However, if the image is taken in a low-illumination setting, the flow proceeds to step S707 for decreasing the gain for image sensor so as to reduce the noise associated with the image captured. After that, the memory bits are selectively retrieved (step S709). It is worth noting that the details of the image may be lost during the step of retrieving the memory bits when the image is taken in the low-illumination setting. In the present invention, only the data in the effective memory bits such as the lower level of the memory bits would be retrieved, in order to preserve more details.

In the next step S711, a corresponding linear operation is performed to adjust the tone of the image within a range. The tone adjustment can raise the contrast of the digital image signals for generating an accurate real-time focused image. The tone-adjusted digital image signals can cause the lens module to perform the AF (step S713) and enable the real-time preview (step S715).

Figure 8:
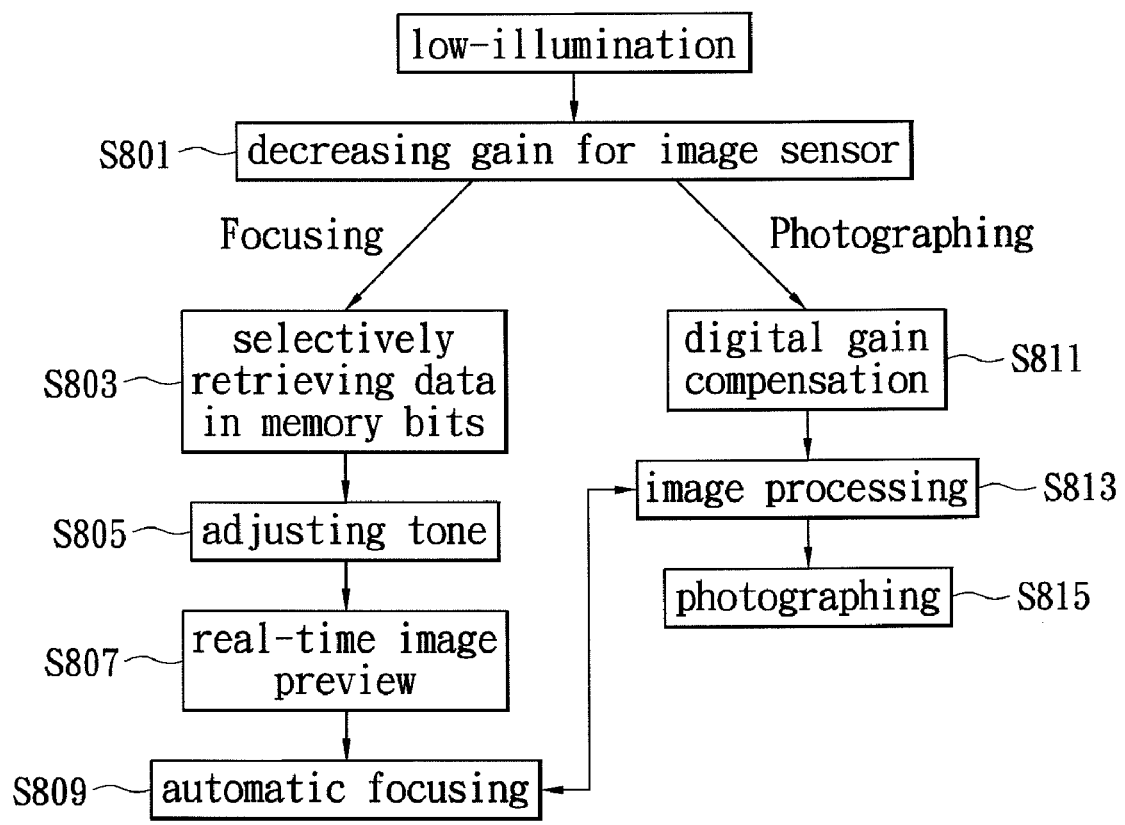
FIG. 8 is a flow chart showing steps for AF in a low-illumination setting according to one embodiment of the present invention.

Further reference is made to FIG. 8 showing a flow chart illustrating steps for AF in a low-illumination setting according to one embodiment of the present invention. This flow shows the process of photographing in the low-illumination setting. The process is configured to reduce the gain of the image sensor for reducing the noise (step S801). Next, the captured image can be used for focusing and photographing.

For the performance of focusing, the present invention will selectively retrieve the data in the memory bits (step S803). Next, the process adjusts the tome of the signals in step S805. The image that has been subject to the tone adjustment may be provided for real-time image preview (step S807). The focusing system receives the digital image signals after the tone adjustment, and produces a focused image, which is also a real-time image. The focused image is used for AF. A plurality of positions as the lens module moves are used to calculate a plurality of definitions. The position of the lens module associated with the largest definition can be identified, and such lens module position may serve as the result for AF (step S809).

When the captured image is used for photographing, since the step S801 decreases the gain for the image sensor the process may proceed to step S811 to digitally compensate the digital image signals. This step is configured to render the image that could be viewed on the screen to be with the same brightness as that of with the image before the gain for the image has not been decreased. Step S813 is configured to process upon the receipt of the result of AF before any photographing is performed (step S815).

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An automatic focusing system in a low-illumination setting, comprising:
    a lens module for taking an image;
    an image sensor connected with the lens module for converting the taken image into digital image signals;
    a gain adjustment unit connected to the image sensor for adjusting a gain of the digital image signals in order to reduce a noise associated with the digital image signals;
    a memory bits retrieving unit connected with the gain adjustment unit for retrieving data in memory bits of the digital image signals after the noise associated with the digital image signals has been reduced;

a tone adjustment unit connected with the memory bits retrieving unit for performing a tone adjustment for the digital image signals, thereby increasing a contrast of the digital image signals;

a focused image generating unit connected with the tone adjustment unit for receiving the digital image signals, and converting the digital image signals into a focused image; and a focusing unit connected to the focused image generating unit and the lens module, wherein the focusing unit firstly calculates a definition of the focused image, and automatically adjusts the lens module for further photographing according to a focus associated with the definition.

2. The system of claim 1, wherein the system distinguishes a high-illumination setting from the low-illumination setting according to an exposure value.

3. The system of claim 2, wherein the exposure value is generated by an automatic exposure unit.

4. The system of claim 1, wherein an imaging created by the focusing unit automatically adjusting the lens module according to the focus is displayed as a real-time image.

5. The system of claim 1, wherein the gain adjustment unit is used to decrease the gain of the digital image signals generated by the image sensor, in order to reduce the noise.

6. The system of claim 1, wherein the tone adjustment unit performs a corresponding linear operation for performing the tone adjustment.

7. The system of claim 1, wherein the definition is calculated according to a position of the lens module and the position of the lens module that is associated with a largest definition serves as a basis for automatically focusing.

8. The system of claim 7, wherein the definition is calculated according to a comparison between pixels at an edge of the image.

9. The system of claim 1, wherein the memory bit retrieving unit selectively retrieves the data in the memory bits.

10. The system of claim 9, wherein the memory bits retrieving unit retrieves the data at lower memory bits as photographing in the low-illumination setting.

11. A method for automatic focusing in a low-illumination setting, comprising:
(a) capturing an image by a lens module and converting the image into a corresponding digital image signal through an image sensor;
(b) determining an illumination of the image, and when the illumination of the image is indicative of the image is captured in the low-illumination setting, further comprising:
(i) adjusting a gain of the image sensor for reducing a noise associated with the digital image signal;
(ii) selectively retrieving data in a plurality of memory bits of the digital image signal;
(iii) adjusting tone of the digital image signal for raising a contrast of the digital image signal; and
(c) enabling an automatic focusing for the lens module.

12. The method of claim 11, wherein enabling the automatic focusing further comprises:
preparing a focused image after adjusting the tone of the digital image signal; and
calculating a plurality of definitions according to positions of the lens module, wherein the position that corresponds to the definition of a largest value serves as a basis for an enablement of the automatic focusing.

13. The method of claim 11, further comprising determining the illumination of the image according to an exposure value generated by an auto-exposure procedure.

14. The method of claim 13, further comprising determining whether the image is in the low-illumination setting according to a threshold.

15. The method of claim 11, wherein the step of adjusting the gain of the image sensor comprises decreasing the gain of the digital image signal so as to reduce the noise.

16. The method of claim 11, wherein the step of adjusting the tone comprises performing a corresponding linear operation on the data of the selected memory bits of the digital image signal.

17. The method of claim 11, further comprising retrieving the data at lower memory bits when photographing in the low-illumination setting.

* * * * *